United States Patent [19]

Lonseth et al.

[11] 4,001,616
[45] Jan. 4, 1977

[54] GROUNDING OF OUTER WINDING INSULATION TO CORES IN DYNAMOELECTRIC MACHINES

[75] Inventors: Palmer Lonseth; Neil Robertson Selkirk; Hubert Gerald Panter, all of Peterborough, Canada

[73] Assignee: Canadian General Electric Company Limited, Toronto, Canada

[22] Filed: Feb. 10, 1975

[21] Appl. No.: 548,835

[30] Foreign Application Priority Data

Feb. 18, 1974 Canada .................... 192819

[52] U.S. Cl. .................... 310/45; 174/102 SC; 428/323; 310/215
[51] Int. Cl.² .................... H02K 15/12
[58] Field of Search ............ 310/194, 45, 196, 215, 310/260, 270, 208, 156; 336/223, DIG. 1; 428/323; 174/102 SC, 110

[56] References Cited

UNITED STATES PATENTS

| 1,891,716 | 12/1932 | Laffoon | 310/196 |
| 2,427,700 | 9/1947 | Atkinson | 310/196 |
| 2,939,976 | 6/1960 | Manni | 310/196 |
| 3,254,150 | 5/1966 | Rogers | 310/45 |
| 3,509,096 | 4/1970 | Kull | 310/196 |
| 3,670,192 | 6/1972 | Andersson | 310/196 |
| 3,824,683 | 7/1974 | Rhudy | 310/45 |
| 3,891,880 | 6/1975 | Britsch | 310/196 |

FOREIGN PATENTS OR APPLICATIONS

| 932,013 | 8/1973 | Canada | 310/45 |

*Primary Examiner*—R. Skudy
*Attorney, Agent, or Firm*—James W. Mitchell; John F. Ahern

[57] ABSTRACT

According to the invention electrically conductive paths are provided between the coil armor and the core laminations of dynamoelectric machines by placing a semiconducting elastomeric material between the coil sides and the walls of the core slots. The elastomeric material is of a type which has a controlled resistance and will deform sufficiently under pressure to flow into the irregularities between the coil side and the slot walls, and in so doing provide conductive paths for electric charge to flow from the armor to the core laminations. This material must be capable of retaining its strength, elasticity, conductivity, etc., and remaining in place between the coils and core under vibration, coolant flow, electric stresses, repeated temperature changes, etc., for the operating life of the machine. Preferably, these paths will be heat conductors as well.

4 Claims, 5 Drawing Figures

GROUNDING OF OUTER WINDING INSULATION TO CORES IN DYNAMOELECTRIC MACHINES

BACKGROUND OF THE INVENTION

This invention relates to means for providing conductive paths from the outer surface of conductor insulating jackets to the magnetic cores in dynamoelectric machines.

In a laminated magnetic core for a dynamoelectric machine the dimensions of the teeth vary somewhat between laminations, and the positions of the laminations vary in the core stack. These irregularities are great enough that the surfaces of the slots have somewhat jagged faces. The coils used in the machine are insulated with outer jackets consisting of wrappings of porous materials inpregnated with certain thermosetting resins and shaped in a mold while the resin is cured to a solid and hard state. This leaves the outer surfaces of the coils very smooth, hard and with some irregularities in their flatness. When these coils are in place in the slots, the smooth outer surfaces of the coils make physical contact with some of the high laminations, leaving voids between the jacket and the remaining laminations.

The variations in the dimensions of the coils also lead to voids or exaggerate the voids mentioned above. If portions of a coil side are smaller than the largest size that the slot will take, the voids left between it and the slot wall will probably be larger and more numerous than they would be with a coil side of this largest size. In other words, a coil side of uniform dimension of this largest size throughout its length will be a closer fit in the slot than a smaller coil side. The actual tolerance of a coil side may be in a range of several mils. Hence the variations in the dimensions of the coils contribute equally or perhaps more to the formation of voids than do the laminations of the core stack.

Electrical grade resinous materials should be good insulators of electricity and reasonably good conductors of heat. Certain epoxy resins meet this specification. However, those that do cure to a hard state, and once fully cured, they do not soften appreciably when reheated during operation of the machine. As a result, the resin impregnants do not soften when the coils become hot and flow into the voids as did the asphaltic impregnants that preceded them. Becuase the resinous materials do not soften with heat and flow into the voids, the voids remain.

Initially, the armor covering on the coils make good electrical contact with the laminations projecting farthest into the slots. These contacts placed the armor and core at essentially the same potential. However, vibration from machine operation will often break these contacts and cause a difference of potential between the armor and core. This potential difference imposes electrical stresses on the air in the voids, stresses that may well be great enough to cause partial discharge from the coil surfaces to the core, i.e., a phenomenon often referred to as corona or corona discharge. The improved resinous materials make higher operating voltages possible, and this in turn subjects the void regions to higher electrical stresses, or these newer insulations may even increase stresses without an increase in voltage. It is well known that in the presence of corona discharge insulating materials are eroded and may eventually break down.

Therefore, the primary object of this invention is to inhibit corona in dynamoelectric machines.

The voids between the coil sides and the cores of dynamoelectric machines also act as barriers to the transfer of heat from the winding to the core laminations. It is well known that the rating of a machine is limited by its ability to get rid of heat, and it is therefore very important that there be optimum heat transfer from the winding to the core.

A further object of the invention is to inhibit corona in combination with improving the transfer of heat from the winding to the core laminations.

According to the invention conductive paths are provided between the winding coils and the core laminations of a dynamoelectric machine by placing a semiconductive elastomeric material between the coil sides and the walls of the core slots. The elastomeric material is of a type which will deform sufficiently under pressure to flow into the irregularities between the coil side and the slot walls, and in so doing provide condutive paths from the outer jackets of insulation on the coils to the core laminations. This material must be capable of retaining its strength, elasticity, conductivity, etc., and remaining in place between the coils and core under vibration, coolant flow, electric stresses, repeated temperature changes, etc., for the operating life of the machine.

Certain silicone resins are well suited for use as conductive path forming materials between the coils and core. Inherently, silicone resins are good electrical insulators, but some are relatively good conductors of heat as well. The good heat conductors are preferred because they will transfer heat from the coils to the core. However, to make them electrically conductive for corona inhibiting purposes according to the invention, they are filled with conductive fine particle materials such as carbon powder, lamp black or a mixture thereof. The amount of conductive powder added to the resin is just enough to give it the required electrical properties, but not enough to detract significantly from the physical properties mentioned in the previous paragraph.

Canadian Pat. No. 932,013, issued Aug. 14, 1973, Lonseth et al discloses a heat conductive material placed between the coil sides and slot walls for transferring heat from the outer surfaces of the coils to the core. The preferred embodiment of this invention may be considered an improvement on the patent in that the material is electrically conductive as well. However, although thermal conductivity is preferred, it is not essential in the practice of this invention.

BRIEF DESCRIPTION OF THE DRAWINGS

Two embodiments of the invention will now be described in more detail with reference to the accompanying drawings, in which.

DETAILED DESCRIPTION OF THE INVENTION

For purposes of the foregoing discussion and the description to follow, a winding for a dynamoelectric machine is to be regarded as a large number of coils interconnected in a suitable circuit configuration. Each coil may have one or more turns of either a single conductor or a number of parallel strands. When references are made to coil sides, these are the portions of a coil that are located in the slots of the core.

Figure 1:
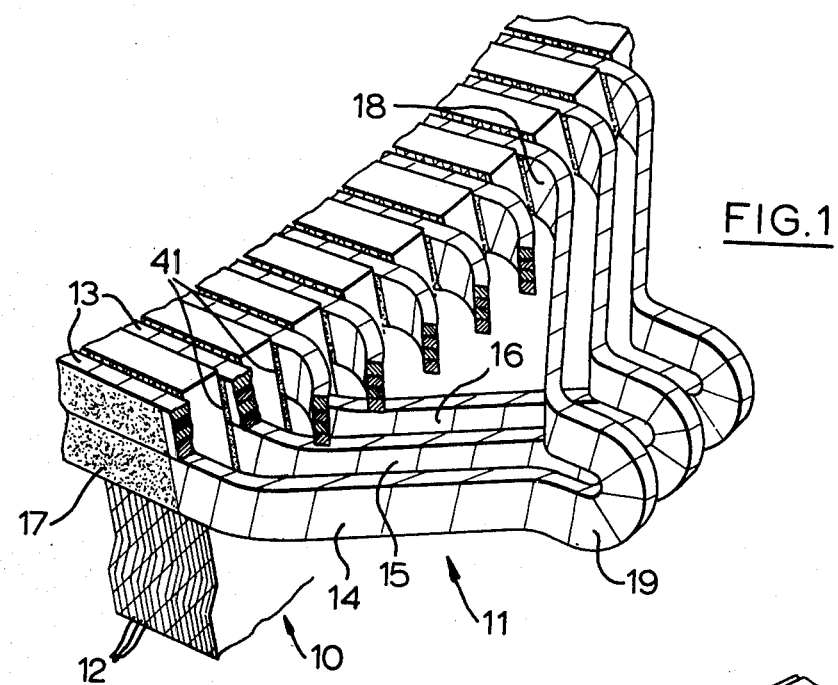
FIG. 1 is a perspective view of a number of coils and a portion of a core for a dynamoelectric machine.

FIG. 1 shows a portion of a stator for a dynamoelectric machine such as a large generator. It consists of a laminated magnetic core 10 and a winding 11. The core is made up of a stack of laminations 12 containing a plurality of axially directed slots 13, and the winding of a plurality of coils 14, 15, 16, etc., having sides 17 and 18 located in two different slots and end heads (end turn windings) 19 projecting axially from the core. Each coil has one side located in the bottom of one slot and the other side in the top of another slot as indicated for sides 17 and 18 of coil 14. The core and coil arrangement shown in FIG. 1 is a conventional core having a plurality of equally spaced slots containing a conventional distributed winding wherein the coil span is approximately one pole pitch. This arrangement is frequently found on the primary side of AC motors or on the armature of AC generators. The invention to be described later is in no way limited to this or any other particular core and coil arrangement.

Figure 2:
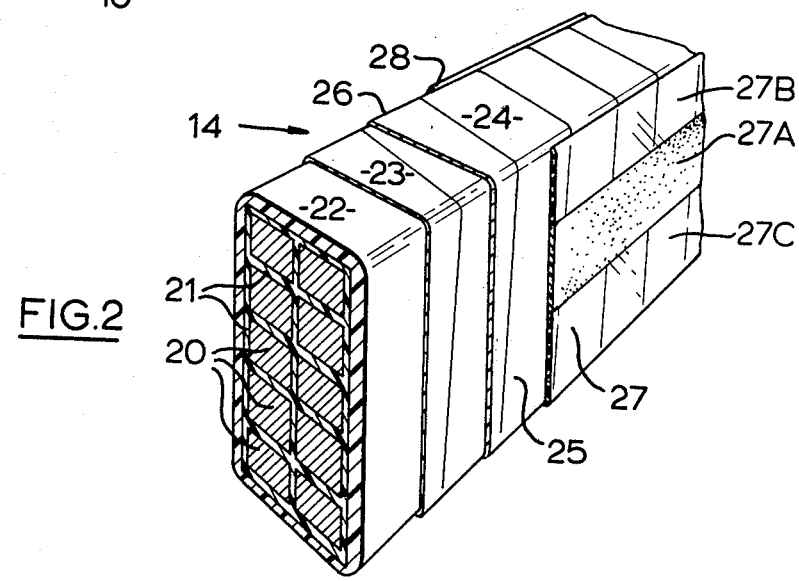
FIG. 2 is a perspective view of a portion of a coil.

A portion of a coil side 17 or 18 is shown in FIG. 2 as consisting of a plurality of conductor strands 20 insulated from one another as indicated at 21 and totally enclosed in a jacket consisting of a number of superposed layers of insulation 22, 23 and an outer armor jacket 24. The strand insulation may be covering of bonded glass filaments. After the strands have been formed into a coil of the desired number of turns and shape, the insulating and armor jackets are applied.

The insulating layers are usually resin bonded micaceous tapes, and the armor one or more layers of a semiconducting tape or paint, i.e., a material having a controlled resistance. The tapes may be several mils in thickness, and they may be applied in a number of layers, depending on the voltage that they must withstand. The layers are applied tightly and as uniformly smooth as possible, after which the resins in the tapes are cured by heat and pressure to achieve the necessary insulating properties. Even with the most careful application of the tapes and curing of the resins with the coil sides in pressure molds, there will be some variations in the width of the coil sides and flatness of their radial surfaces as illustrated in exaggerated form at 35 and 36 in FIG. 3. These variations are usually great enough that a coil side itself leaves voids between it and the slot wall or exaggerates the voids caused by irregularities in the slot wall. When fully cured the resin bonded materials become very hard and rigid and do not soften appreciably when reheated. As a result, surfaces 25 and 26 of the coils present somewhat irregular and unyielding interfaces with the irregular surfaces of the punchings forming the slot walls. The hard coil surfaces do not soften when reheated from machine operation and deform sufficiently to fill the voids defined by these irregularities and maintain electrical contact with the core laminations as did the asphaltic compounds of the prior art. Initially, the semiconducting armor made good electrical contact with the core laminations so that the armor and slot walls were held at essentially the same potential. However, vibration from operation of the machine will often break these contacts, causing a difference of potential which increases the stress on the air in the voids. This increase in stress can be great enough to cause corona in the voids, i.e., partial discharge from the armor jacket 24 to core 10. Moreover, even after repeated heating, the irregularities between the coils and core remain as barriers to the transfer of heat from the coils to the core laminations. Because the insulating jacket retains its shape, it may make physical contact with the higher laminations only, leaving voids or small air pockets between the jacket and the lower laminations. Hence the heat generated in the conductors is transferred to the core mainly through those higher laminations in contact with the jacket. This does not lead to optimum cooling or the best use of the conductors as current carriers. The materials of jackets 22, 23 and 24 are selected for their good electrical and thermal properties. They are therefore quite capable of conducting the heat from the conductors to the core given reasonably good transfer conditions at the armor jacket and core interfaces.

Figure 3:
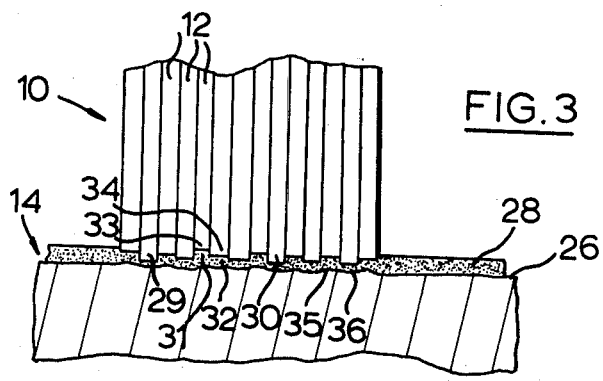
FIG. 3 is a plan view looking into a slot of the structure shown in FIG. 1.

According to one embodiment of the invention, the radial surfaces 25 and 26 of each coil side 17 and 18 are coated with thin layers 27 and 28 respectively of a semiconducting material which will adhere to the jacket and deform when the coil side is pressed into the slot. Without layers 27 and 28, the coil side is a reasonably close fit in the slot, i.e., a clearance fit, and with the layers it is an interference fit in the slot. FIG. 3 is an exaggerate illustration of a coil side in its final resting place in a slot. As the coil side was pressed into the slot, the interfering higher laminations 29 and 30 made the material of layer 28 flow into the spaces 31 and 32 left between the surface 26 of the coil side and the lower laminations 33 and 34. In other words, the compressive forces applied to the material by some laminations made it flow over other laminations into the voids that would otherwise remain between some of the laminations and the jacket. Layers 27 and 28 are just thick enough initially that once deformed most of the laminations come into contact with the deformed material so that it now forms a conductive bridge from the coil armor to substantially all the laminations of the core. This bridge will have an electrical conductivity, i.e., a controlled resistance, that will allow electric charge on the armor to flow to the core. Preferably, it will be heat conductive as well.

Materials found suitable for making layers 27 and 28 are certain room temperature vulcanizing silicone resins filled with a fine particle electrically conductive material, e.g., powdered carbon and/or lamp black, in proportion that will give the material a controlled resistance and not significantly change the properties of the resin. For purposes of this invention, a semiconducting material is an electrically conductive material of controlled resistance, i.e., a material having a resistance low enough that the material readily conducts charge on the coil armor to the core laminations and yet high enough that the edges of the core laminations are not electrically connected together in the form of eddy current paths. The filled elastomeric material has a thixotropic consistency which makes it possible to apply in a thin layer to surfaces such as 25 or 26. In forming layers 27 and 28, a strip of the filled resin is laid on each of the surfaces 25 and 26 and the strips are spread over the surfaces in uniform layers 27 and 28 by placing the coil side in a mold where it is held until the resin is cured enough to hold its shape. A sheet of moist paper may be placed between the material and the mold to accelerate curing of the resin. The thickness of the layers may be in the order of 5 to 20 mils. These filled silicone resins cure to a permanently flexible state; they do not harden, crack or dry out with the passage of time. They are tough, strong, deform without tearing, electrical conductors of controlled resistance and relatively good conductors of heat. They bond well to other materials and are resistant to aging, electrical stresses, chemical attack and high temperatures. The adherence of these materials to the coil jacket along with their flexibility and toughness make them preferred materials for layers 27 and 28. These materials are displaced from the more closely fitting regions into the more loosely fitting regions between the jacket and the wall of the slot as the coil side is forced into the slot. To facilitate the installation of a coil side in a slot its outer surfaces may be coated with a thin film of a petroleum grease and the slot walls sprayed with a liquid fluorocarbon, the grease and fluorocarbon serving as lubricants at the coil and slot interfaces.

In FIG. 2, layer 27 is shown in three strips 27A, 27B and 27C disposed lengthwise of the coil side. The full coverage shown at 27 is not always necessary for electrical purposes, or better results may even be obtained with less than full coverage. However, full coverage is desirable for heat transfer purposes. As a result, a strip 27A may be made electrically and thermally conductive and the remaining strips 27B and 27C thermally conductive only. Stated otherwise, strip 27A is the filled silicone resin mentioned in the previous paragraph, and strips 27B and 27C are the unfilled thermally conductive silicone resins disclosed in the aforementioned Canadian Pat. No. 932,013. Full coverage 27, although not all electrically conductive, is desirable so that the heat produced in the coils can be readily transferred to the core. In forming layer 27 into strips 27A, 27B and 27C, three very narrow strips of the resins are laid along the coil surface and then molded into the broader flat strips by the process mentioned earlier. Layer 28 may also be formed in strips as in the case shown for layer 27.

Since the resinous material is, in effect, squeezed between the armor on the coil sides and the walls of the slots, it places a substantial area of the armor in electrical and thermal contact with a substantial area of the slot walls. Although preferable, it is not essential that the material fill all the voids and make full contact with all the surfaces. In most cases, an overall contact area between the core and coil surfaces somewhat in excess of 75% provides adequate heat transfer, and a strip of this area provides adequate discharge paths to maintain the surfaces at essentially the same potential so as to minimize corona.

It was mentioned previously that without the layers 27 and 28 of elastomeric material the coil side is a reasonably close fit, i.e., a clearance fit, in its slot, and with these layers it is an interference fit in the slot. With an interference fit the higher laminations force some of the elastomeric material of the layers 27 and 28 to flow into the spaces between the outer jacket of the coil side and the lower laminations as the coil side is pressed into its slot. It was also mentioned that to facilitate installation of each coil side into its slot, the outer surfaces of layers 27 and 28 may be coated with a thin film of a petroleum grease and the slot walls sprayed with a liquid fluorocarbon, the grease and fluorocarbon serving as lubricants at the coil and slot interfaces. However, where the coil side is a particularly heavy interference fit in the slot, inserting a coil side into its slot by normal hand techniques has been found to be very difficult. When a machine press is available, it can be used for pressing the coil sides into their slots. However, a machine press is not always available.

Figure 4:
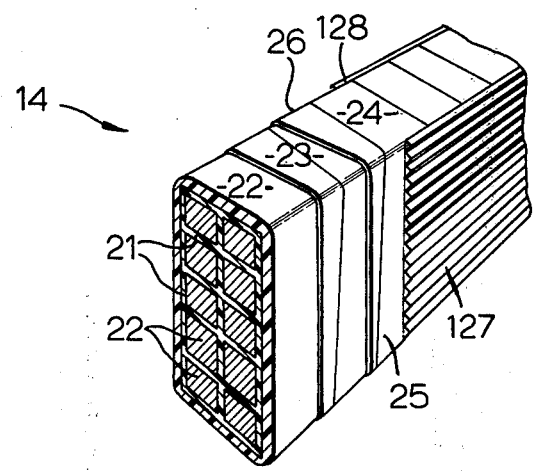
FIG. 4 is a perspective view of a portion of a coil showing the elastomeric material distributed in strips or ridges along one side of the coil.
Figure 5:
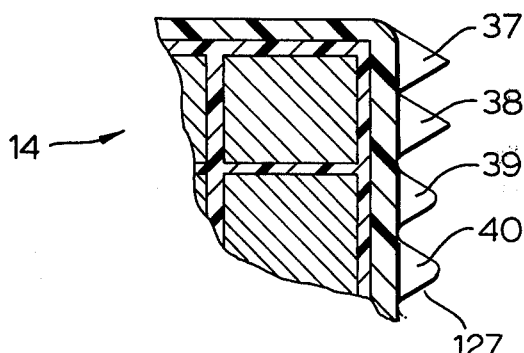
FIG. 5 is a partial end view highlighting the strips of elastomeric material of the FIG. 4 coil.

FIGS. 4 and 5 illustrate another embodiment of the invention in which the elastomeric material is distributed on the coil sides in such a way that it deforms more readily as a coil side is inserted into a slot. This facilitates placing the coil sides in the slots by hand, i.e., without the use of a press. In these figures, the layers 127 and 128 of elastomeric material are now in the form of a number of ridges 37 to 40 along the coil as shown for layer 127. These ridges may be generally triangular in cross section, e.g., the triangles shown in FIG. 5 for ridges 37 and 38 or the triangles 39 and 40 which are rounded at the tips and in the valleys. In practice, ridges of the general shape of 39 and 40 will probably be used because the elastomeric material takes this shape more readily.

The layers 127 and 128 of elastomeric material are applied as follows: First, a thin layer of the elastomeric material is applied over the coil sides. Immediately thereafter, a comb-like spreader having generally triangular shaped teeth is drawn along the coil side so that the teeth shape the elastomeric material into a plurality of generally triangular shaped strips or ridges lying along and covering the coil side. The strips could also be formed so that they run across the coil side instead of along it. However, because the elastomeric material sets very quickly, it is quicker and easier to form the strips lengthwise of the coil side. It may be desirable to combine the application and spreading operation; to do this the applicator and spreader need merely be combined into a single unit.

It has been found that the coil sides are indeed easier to insert in the slots when the elastomeric material is distributed in ridges. This is to be expected regardless of the shape of the ridges, and if there is sufficient material in the ridges, the ridges are deformed to fill substantially all the spaces between the coil sides and slot walls. For example, a covering of equilateral triangular shaped ridges is equivalent to a uniform layer of thickness equal to one half the height of the ridges. Ridges lengthwise or crosswise of the coil sides is not the only way that the elastomeric material may be distributed; it may also be in discrete humps in the form of drops or pyramids.

In all case, the filled elastomeric material provides good conductive paths for electrical discharge and heat transfer. This is possible because the material is bonded to the coil and deformed against the slot wall so that a large portion of the wall is in contact with the material. Even though some voids remain, as they probably will, they will be in the midst of sufficient conductive material to not interfere with its electrical and thermal conductivity to an appreciable extent.

In FIGS. 2 and 4, the semiconducting materials are shown on the radial surfaces only of the coils. However, in order to make the coils as free from corona as possible, their non-radial surfaces resting in the bottoms of the slots may also be covered with the material, either as a layer or as ridges. In some instances, it may be desirable to apply the material to the other non-radial coil surfaces as well.

The air is also subject to ionization in the regions where the coils leave the slots. Ionization in these regions can be minimized by extending the semiconducting coating far enough out from the core to provide a safe and gradual voltage gradient. These extensions are shown at 41 in FIG. 1.

The stranded coil side shown in FIGS. 2 and 4 may be one side of a multi turn coil or a stranded single turn coil. A coil suitable for use with this invention may also comprise a single turn of a rigid conductor suitably shaped. In applications of the invention to water wheel generators the coils will usually be single turn solid conductors, i.e., sides 17 and 18 are conductor bars. The one turn coil is insulated with a jacket much the same as that applied to the stranded coil side shown in FIGS. 2 and 4, and this jacket along with the bar present solid and hard sides for reception by the slots.

Materials found suitable for layers 27, 28, 127 and 128 are certain room temperature vulcanizing (RTV) silicone resins. This type of resin is normally a heat conductor and an electrical insulator. Hence, to render it electrically conductive, it is filled with fine particles of graphite and/or lamp black dispersed in the material. Examples of suitable silicone resins are those sold by the General Electric Company, Waterford, New York as RTV-108 and CRTV-5120, the former being an unfilled thermally conductive silicone resin and the latter a filled electrically and thermally conductive silicone resin. The amount of filler added is just enough to give the material an electrical resistance within a range of approximately 1000 to 80,000 ohms per square, and preferably about 4000 ohms per square. A resistance controlled within this range renders the material sufficiently conductive for readily passing charge on the coil armor to the core and sufficiently non-conductive that it does not form eddy current paths between the core laminations. The resistance of the material is of the same order of magnitude as the resistance of the coil armor. Materials answering this description are known in the art as "semiconducting" materials. The amount of filler added is low enough that the physical and chemical properties of the material are not changed to a significant extent, and, moreover, these properties along with the electrical resistance are maintained over the life of the machine.

What I claim is:

1. A core and coil structure for a dynamoelectric machine comprising a stack of laminations formed with slots for receiving sides of coils; and a winding of coils having sides disposed in said slots and end turns projecting from the core stack, each one of said coil sides having at least one conductor strand encased in a hard, unyielding jacket of insulating materials and the jacket of insulating materials covered by a hard, unyielding, semiconducting armor jacket; variations in the laminations and the surface of said armor jacket defining voids between the armor jacket and the slot wall; the improved means for conducting electric charge from said armor jacket to said core stack comprising a pressure deformable, semiconducting material located continuously between said armor jacket and said slot wall, said semi-conducting material being deformed by pressure into said voids and having an electrical resistance low enough to conduct electric charge from said armor jacket to said core stack and high enough to avoid significant eddy current flow between core laminations; and, wherein said semi-conducting material is a room temperature vulcanizing silicone resin filled with fine particle graphite and/or lamp black in an amount that gives the filled resin an electrical resistance within an approximate range of 1000 to 80,000 ohms per square.

2. The structure defined in claim 1, wherein said semiconducting material is in the form of at least one thin layer bonded to said armor jacket.

3. The structure defined in claim 1, wherein said semiconducting material is in the form of generally triangular shaped strips bonded to said armor jacket.

4. The structure defined in claim 1, wherein said semiconducting material is in the form of discrete humps bonded to said armor jacket.

* * * * *